United States Patent
Chang et al.

[11] Patent Number: 5,870,166
[45] Date of Patent: Feb. 9, 1999

[54] VERSATILE OPTICAL MOUNTING ASSEMBLY

[76] Inventors: Byung Jin Chang, 5521 Overbrook Dr., Ann Arbor, Mich. 48105; David Nowak, 7300 Park Lane Dr., Dexter, Mich. 48130

[21] Appl. No.: 806,282

[22] Filed: Feb. 25, 1997

[51] Int. Cl.$^6$ .................................................. G02C 1/00
[52] U.S. Cl. ........................................ 351/158; 362/391
[58] Field of Search ........................... 351/41, 158, 245; 359/408, 409, 411; 362/391

[56] References Cited

U.S. PATENT DOCUMENTS

| | | | |
|---|---|---|---|
| 2,370,843 | 3/1945 | Croninger | 88/51 |
| 2,649,019 | 8/1953 | Harline et al. | 88/36 |
| 4,647,165 | 3/1987 | Lewis | 351/158 |
| 4,850,690 | 7/1989 | Parker et al. | 351/205 |
| 4,865,438 | 9/1989 | Wada | 351/158 |
| 5,381,263 | 1/1995 | Nowak et al. | 359/411 |
| 5,541,767 | 7/1996 | Murphy et al. | 351/158 |

FOREIGN PATENT DOCUMENTS

| | | | |
|---|---|---|---|
| 0300384 | 1/1989 | European Pat. Off. | 351/57 |

*Primary Examiner*—Huy Mai
*Attorney, Agent, or Firm*—Gifford, Krass, Groh, Sprinkle, Patmore, Anderson & Citkowski

[57] ABSTRACT

An optical mounting assembly includes a frame, preferably in the form of a shaped wire form, having a proximal section attachable to a headband or to the bridge portion of a pair of eyeglass frames, a mid-section extending downwardly along and in spaced-apart conformity with the ridge of a user's nose, and a distal section which is bent upwardly with respect to the mid section. Optionally, the mid-section may include an adjustable nose pad which is adapted to make contact against the ridge of the user's nose. This provides for improved weight distribution, with the distal section being configured to mountably receive one of a variety of accessories such as light sources, imaging apparatus, face shields, etc.

17 Claims, 13 Drawing Sheets

VERSATILE OPTICAL MOUNTING ASSEMBLY

FIELD OF THE INVENTION

This invention relates generally to vision aids, and, more particularly, to a versatile optical mounting assembly adapted for attachment to a pair of eyeglasses or to a headband. More specifically, the invention relates to wire-mounting apparatus adapted to receive instrumentation associated with scientific and other uses, including medical and dental applications.

BACKGROUND OF THE INVENTION

Telescopic instruments and light sources have become essential for magnifying and illuminating a work area during delicate surgery, dental work, inspection of circuit board solder joints, assembly of miniature parts, and so forth. A typical telescopic instrument may include a high-intensity illuminator and/or a pair of telescopic loupes which are adjustably mounted to an eyeglass frame or headband. Such optical instrumentation provides a user (a surgeon or dentist for example) with a magnified image of the work area with a field of view at about an arm's length.

Available mounting assemblies of this type provide a wide range of adjustments, as evidenced in commonly assigned U.S. Pat. No. 5,381,263, entitled FIVE-DEGREE-OF-FREEDOM OCULAR MOUNTING ASSEMBLY. As the name implies, this patent discloses a highly versatile telescopic ocular mounting assembly, which may include an express flip-up capability. This enables a wearer to rapidly place the oculars into, and out of, the field of view. As with most arrangements of this type, however, it is quite often the case that other, vision-related accessories are to be used in conjunction with the telescopic devices. As one example, light sources are often used alone or collaboratively with magnification devices to illuminate the field of view, thereby enhancing visibility.

Heretofore, however, such accessories have been mounted separately from the eyeglass frames, resulting in separate pieces of instrumentation applied in an uncoordinated manner. There is a need, therefore, for an integrated vision assistance arrangement which preferably provides mounting capabilities for various accessories, such as illumination sources, while retaining an ocular flip-up capability and distributing weight more evenly to enhance user comfort.

SUMMARY OF THE INVENTION

The present invention improves upon existing vision enhancement arrangements by providing a versatile optical accessory mounting system. In a preferred embodiment, the invention takes the form of a shaped wire frame having a proximal section attachable to the bridge portion of a pair of eyeglass frames or to a headband, a mid-section extending downwardly along and in spaced-apart conformity with the ridge of a wearer's nose, and a distal section which is preferably bent upwardly with respect to the mid-section, optionally, the mid-section may include an adjustable nose pad adapted to make contact against the ridge of the user's nose for improved weight distribution, with the distal section being configured to mountably receive one of a variety of accessories.

In the preferred embodiment, the frame incorporates a pair of wires which extend generally parallel to one another from the proximal to the distal section. These wires may either terminate as individual points at the distal section or, alternatively, may join together, preferably as a rounded loop. As a further alternative, the wires may continue their upward-bent configuration and close upon themselves to form a closed-loop embodiment. Accessories mountable on these inventive frame structures include, but are not limited to, vision aids such as light sources, imaging apparatus such as lightweight camera devices, wearer protective devices such as splash guards, etc.

DETAILED DESCRIPTION OF THE INVENTION

Figure 1:
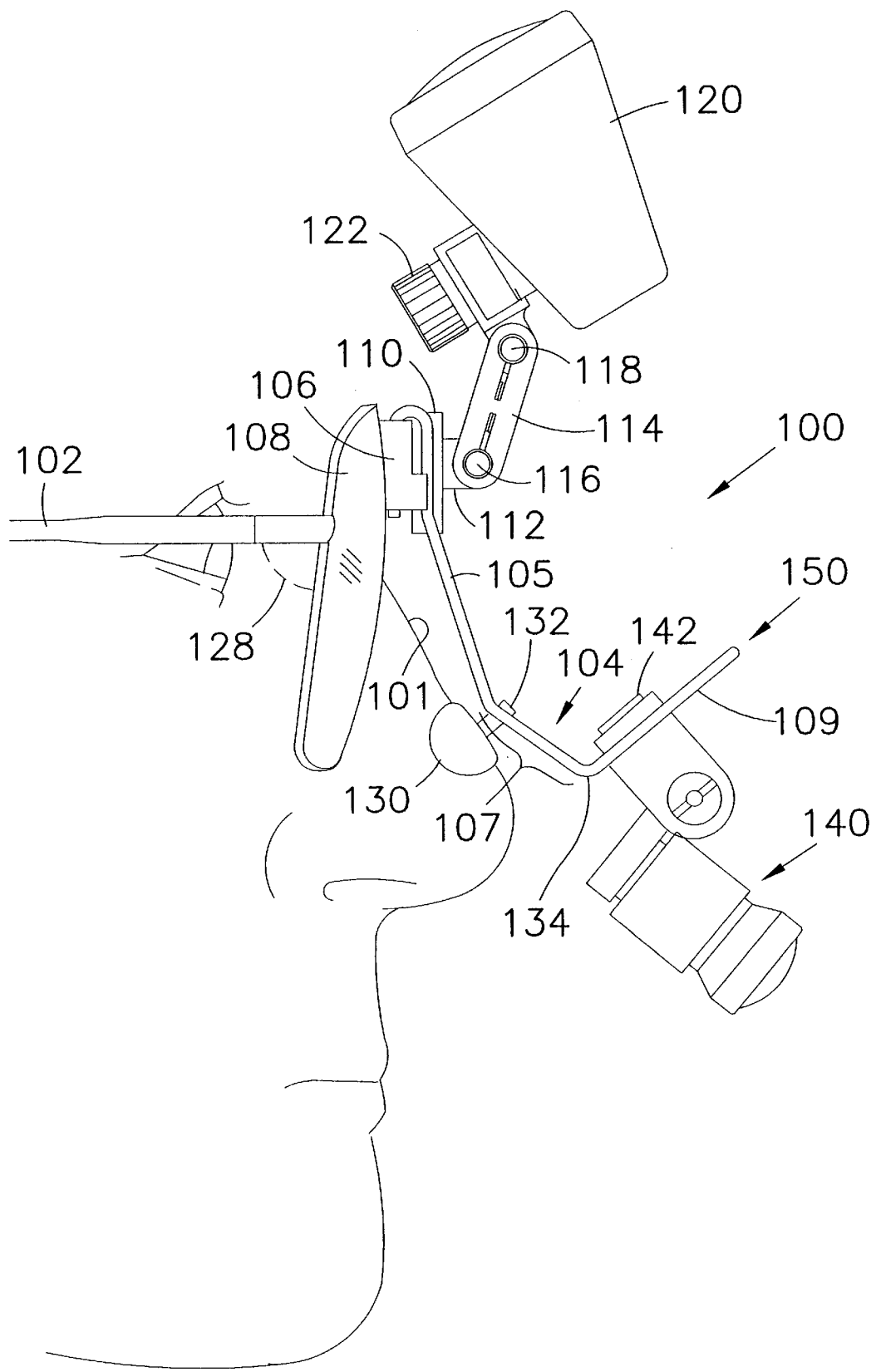
FIG. 1 is a side-view drawing of an embodiment of the invention including a pair of flip-up oculars and a high-intensity light accessory slidably attached to a bridge-mounted wire-frame.
Figure 12:
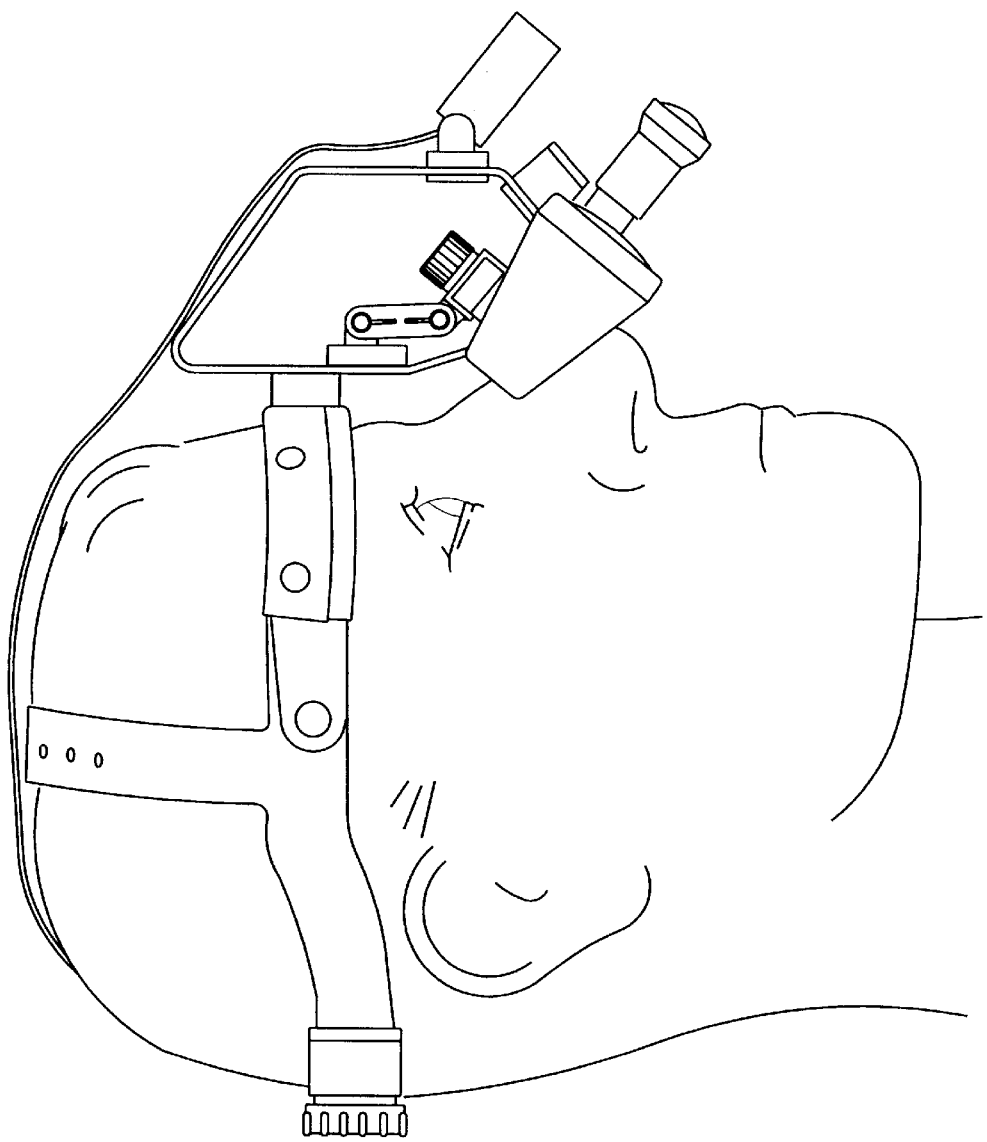
FIG. 12 illustrates the way in which an electronic imager may be coupled to a wire-frame assembly according to the invention.
Figure 13:
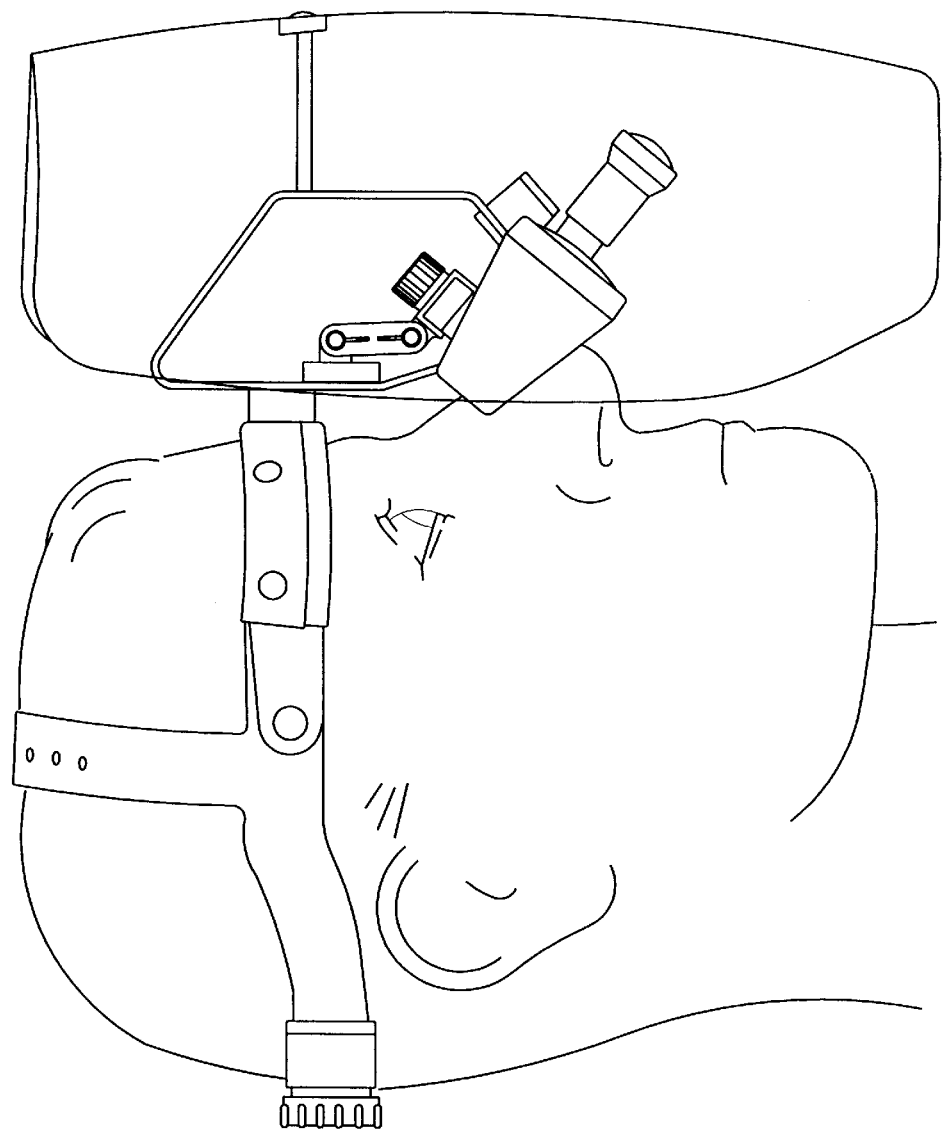
FIG. 13 illustrates the way in which a face shield may be coupled to a wire-frame assembly according to the invention.

In FIG. 1 there is shown generally at 100 an embodiment of the invention wherein a pair of eyeglass frames 102 physically receives a wire-frame 104 to which a vision-related accessory such as lamp assembly 140 is mounted. Although this discussion is primarily directed to the mounting of the lamp assembly 140, it should be kept in mind that, owing to the versatility of the wire-frame 104 as discussed in more detail below, various other types of accessories are readily accommodated by the invention, including different forms of lights, lightweight cameras (i.e., charge-coupled-device types) FIG. 12, nose and/or mouth shields (FIG. 13), and so forth.

The wire-frame 104 is preferably made up of a pair of generally parallel wires defining a proximal section 105, a mid-section 107, and a distal section 109. The proximal section 105 extends generally vertically downwardly but then, so as not to make direct contact with the ridge 101 of the wearer's nose, gradually transitions into the mid-section 107. For a short distance, the shape of mid-section 107 preferably tracks the contour of the ridge 101 of the individual's nose in spaced-apart relation until, at point 134, transitions into the distal section 109. The wire frame 104 is preferably constructed of a steel alloy, though any suitable lighter-weight alternatives may be used, including non-metallic materials if sufficiently rigid. Heat treating may be used either to carry out the bending operations or to stabilize the bent portions following formation, or for both uses, as appropriate.

As an option, at a point preferably midway along the mid-section 107 there is adjustably attached an assembly including a nose pad 130 which may be moved in sliding fashion along the wire frame until a desired user configuration is reached, at which time a fastener 132 may be manipulated to hold the assembly in place. The nose pad 130 itself is preferably constructed of a thin, lightweight yet pliable material such as thin metal, preferably aluminum, and having a nose-facing surface (not visible in the drawings) which is coated or padded with a soft layer to enhance user comfort. Preferably, the nose pad material is malleable, allowing the user may first place the nose pad in an unformed condition on his or her nose. The user may then bend this pliable material around the outer ridge of their nose, until a comfortable conformance is established.

In a preferred embodiment, the distal section 109 forms an angle of approximately 90 degrees, as shown in the figure, with point 134 assuming a curved bend. Alternatively, however, the distal section 109 may simply comprise a linear extension of the mid-section 107, or as a further alternative, may curve or bend downwardly. The ultimate geometry of the distal section 109 is potentially dependent upon a number of factors, including the physiology of the wearer, the intended accessory to be mounted thereon, etc. In addition, the wire frame members comprising distal section 109 may terminate into individual points 150 (only one of which is visible in FIG. 1) or, alternatively, the wires comprising the distal section may connect to one another through a curved connecting arrangement, as better seen in FIGS. 3 to 5.

Figure 2:
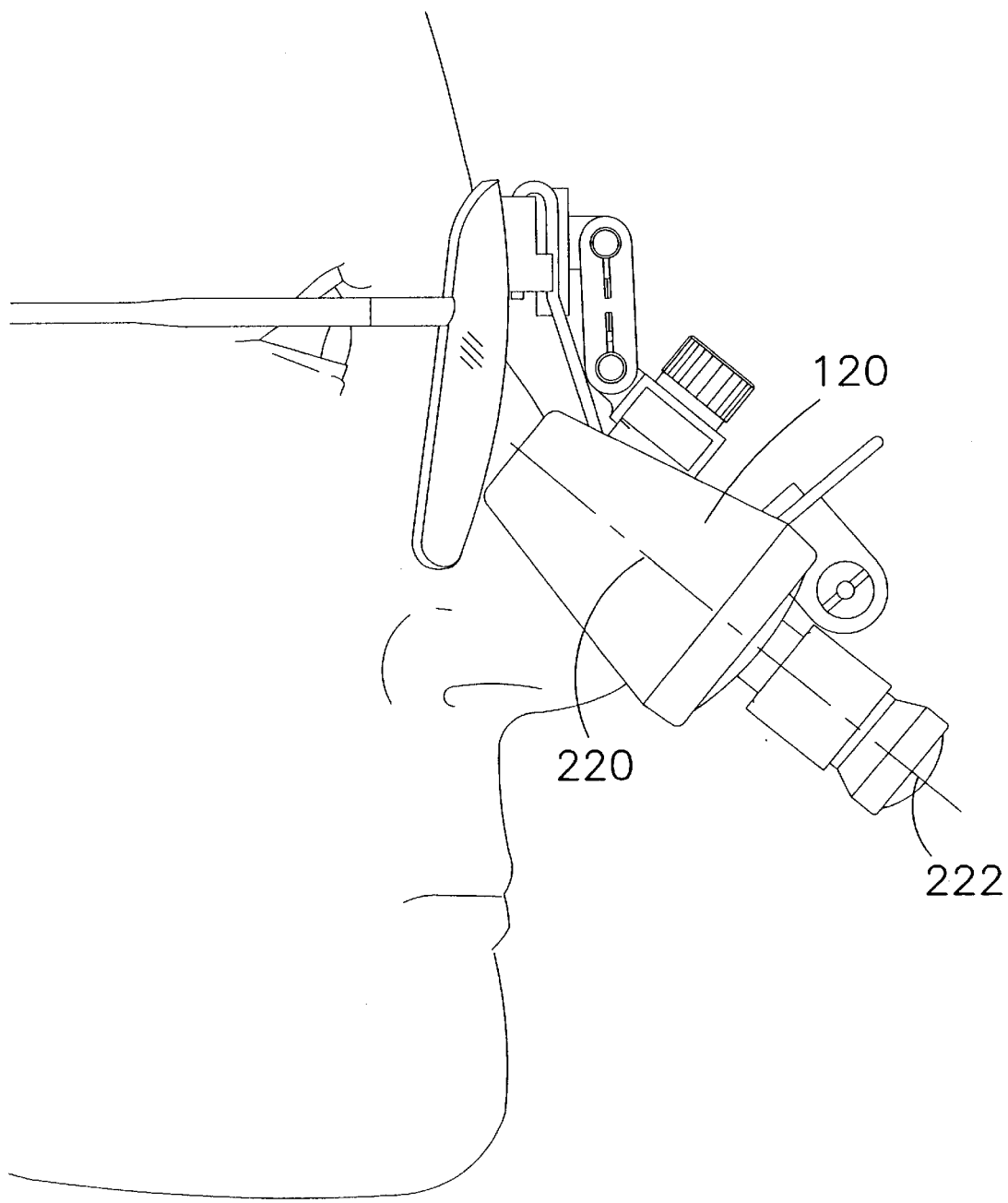
FIG. 2 is a side-view drawing of the embodiment of FIG. 1, but with the oculars in a flipped-down state for use.

In FIG. 2, the assembly introduced with respect to FIG. 1 is depicted once again. But, in this case, the oculars 120 have been flipped down for use. Note that, whereas in FIG. 1, both the oculars 120 and accessory 140 are effectively out of the user's field of view. In FIG. 2, although the user is able to look forward in an unobstructed fashion, the optical axis 220 of the oculars 120 and axis 222 of the accessory, in this case the light assembly, are now generally parallel to one another; thus maximizing illumination and visibility.

Figure 3:
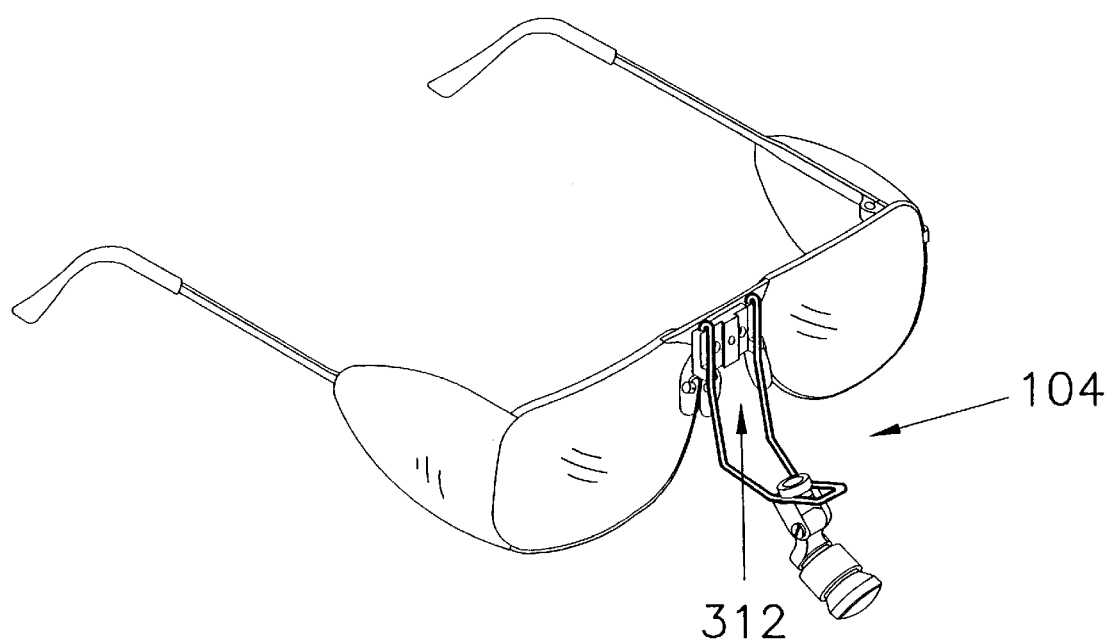
FIG. 3 shows the device of FIGS. 1 and 2 with the flip-up ocular mounting aspect being removed and viewed from an oblique perspective.
Figure 4:
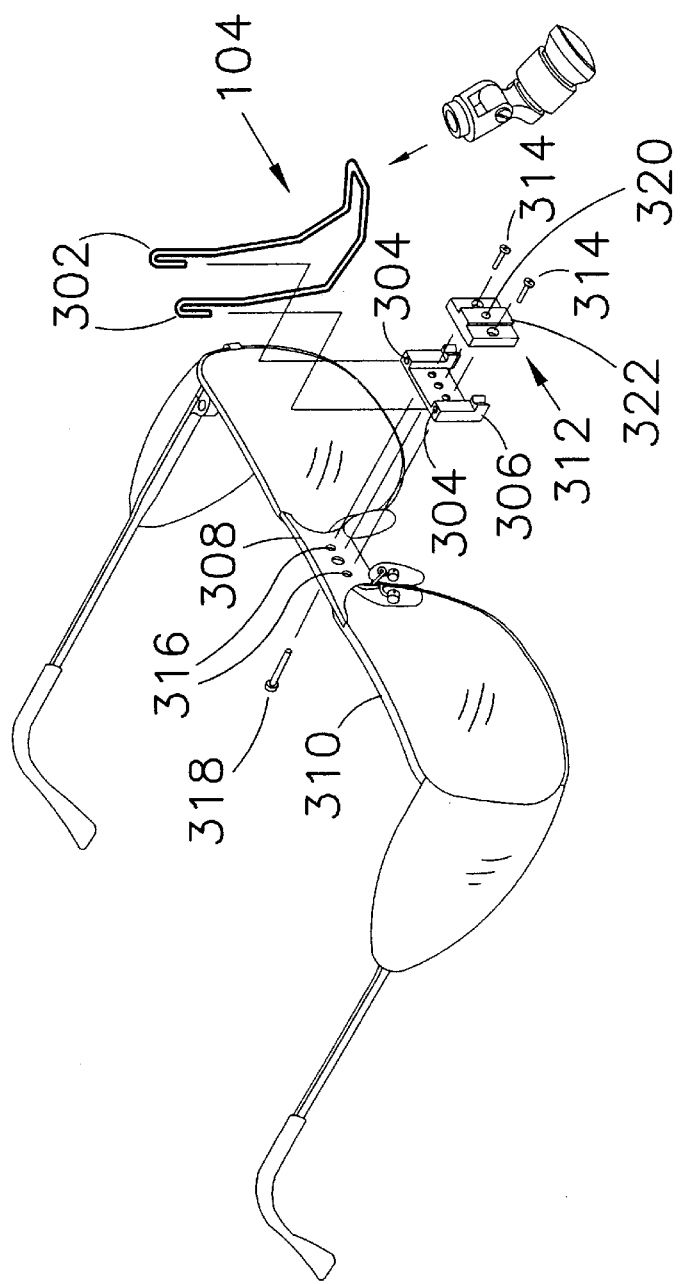
FIG. 4 provides an exploded view of the arrangement of FIG. 3.

FIG. 3 illustrates, from an oblique perspective, the embodiment of FIGS. 1 and 2, but without the oculars attached. FIG. 4 illustrates the embodiment of FIG. 3 in exploded form. The wire frame 104 preferably includes a pair of bent tips 302 at its proximal end, which engage with corresponding sleeves 304 formed in a carrier bracket 306. The reader will note that the wires making up the frame 104 need not be parallel to one another from the proximal to distal portions, but the spacing may be adjusted, as necessary, to receive a particular accessory configuration In FIGS. 3 and 4, for example, the wires are configured more closely to one another to receive the particular lamp assembly shown.

The carrier bracket 306 is preferably mounted in between the bridge portion 308 of the eyeglass frames 310, and a height adjustment rail piece 312. To ensure a stabilized interconnection, a pair of screws 314 may be used from the front side, and fastened into threaded holes 316 on the bridge portion 308, and a third screw 318 from the backside, which engages with a threaded hole 320 on the height adjustment rail 312. The piece 312, which includes a rectangular-shaped undercut path 322, may be similar if not identical in design to that disclosed in commonly assigned issued U.S. Pat. No. 5,381,263 entitled FIVE-DEGREE-OF-FREEDOM OCULAR MOUNTING ASSEMBLY, the entire contents of which are incorporated herein by reference. Included in the disclosure of this issued patent are details associated with the ocular mounting assembly depicted in FIGS. 1, 2, 7, 10 and 11, and need not be reproduced here.

Figure 5:
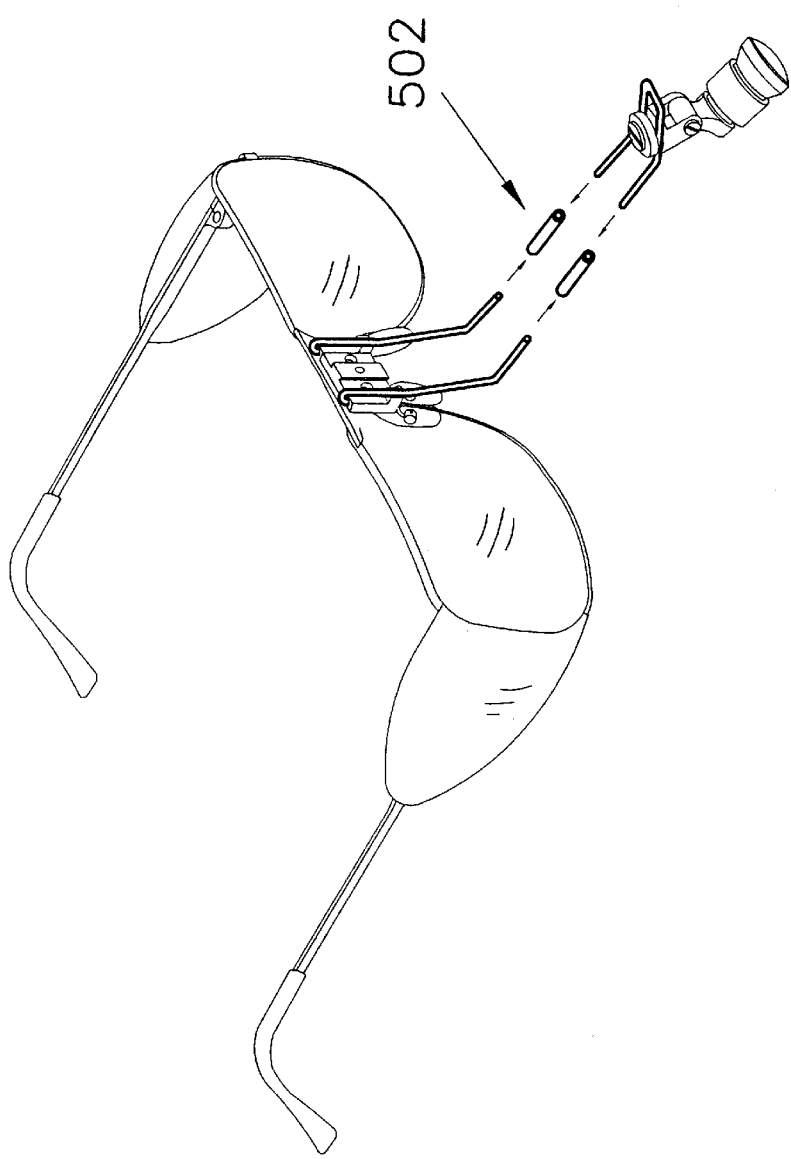
FIG. 5 illustrates how one or more portions of a wire-frame assembly according to the invention may utilize adjustment elements.

FIGS. 5 through 11 are drawings which show additional features made possible by further alternative embodiments of the invention. FIG. 5, for example, illustrates how one or more adjustment elements 502 may be used to extend portions of a wire-frame assembly according to the invention. Although the elements are depicted with reference to the mid-section of the frame assembly, it will be apparent that such elements may be used in conjunction with, or in addition to, other portions of the assembly.

Figure 6:
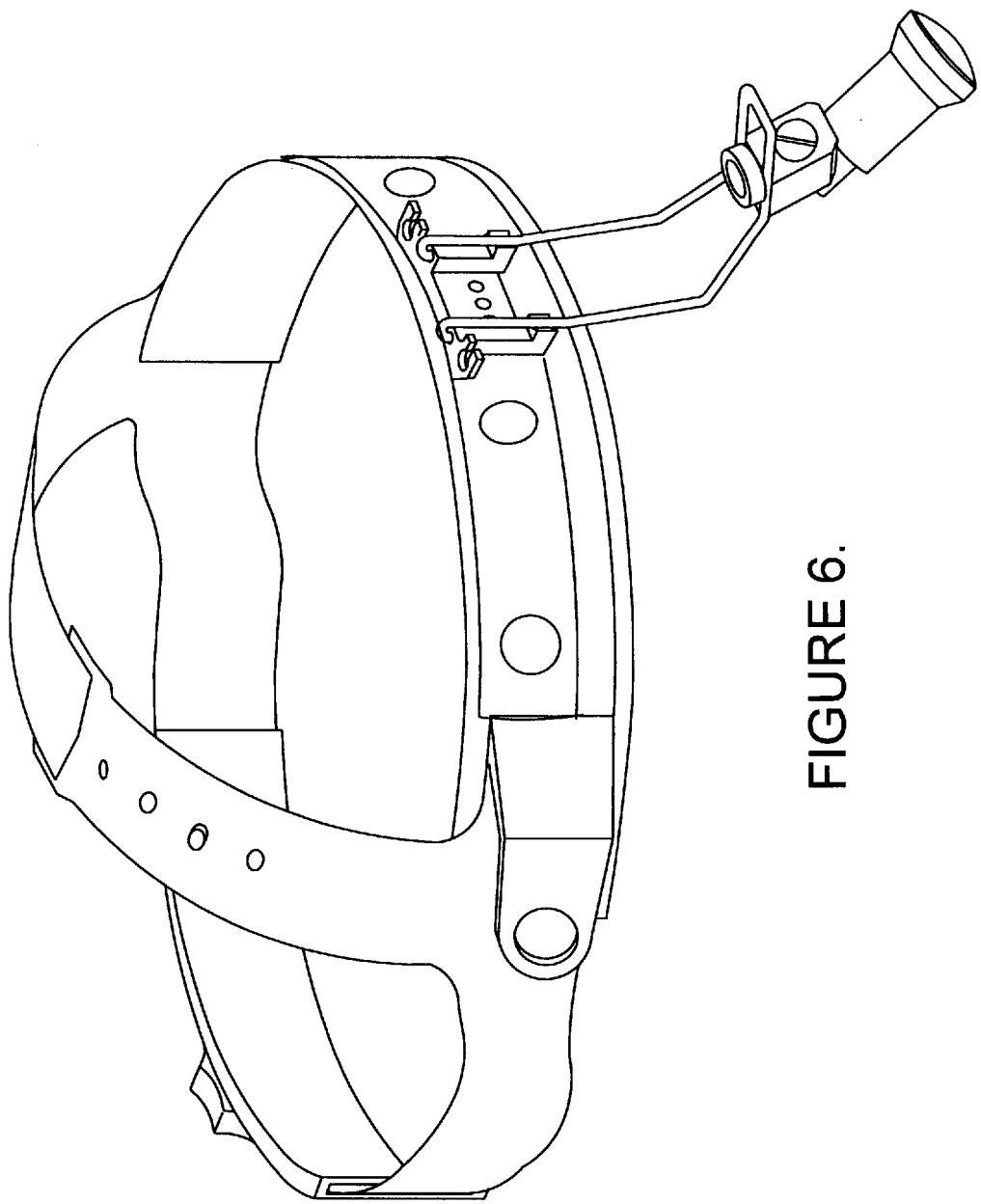
FIG. 6 represents, from an oblique perspective, a headband-mountable alternative embodiment of the invention.
Figure 7:
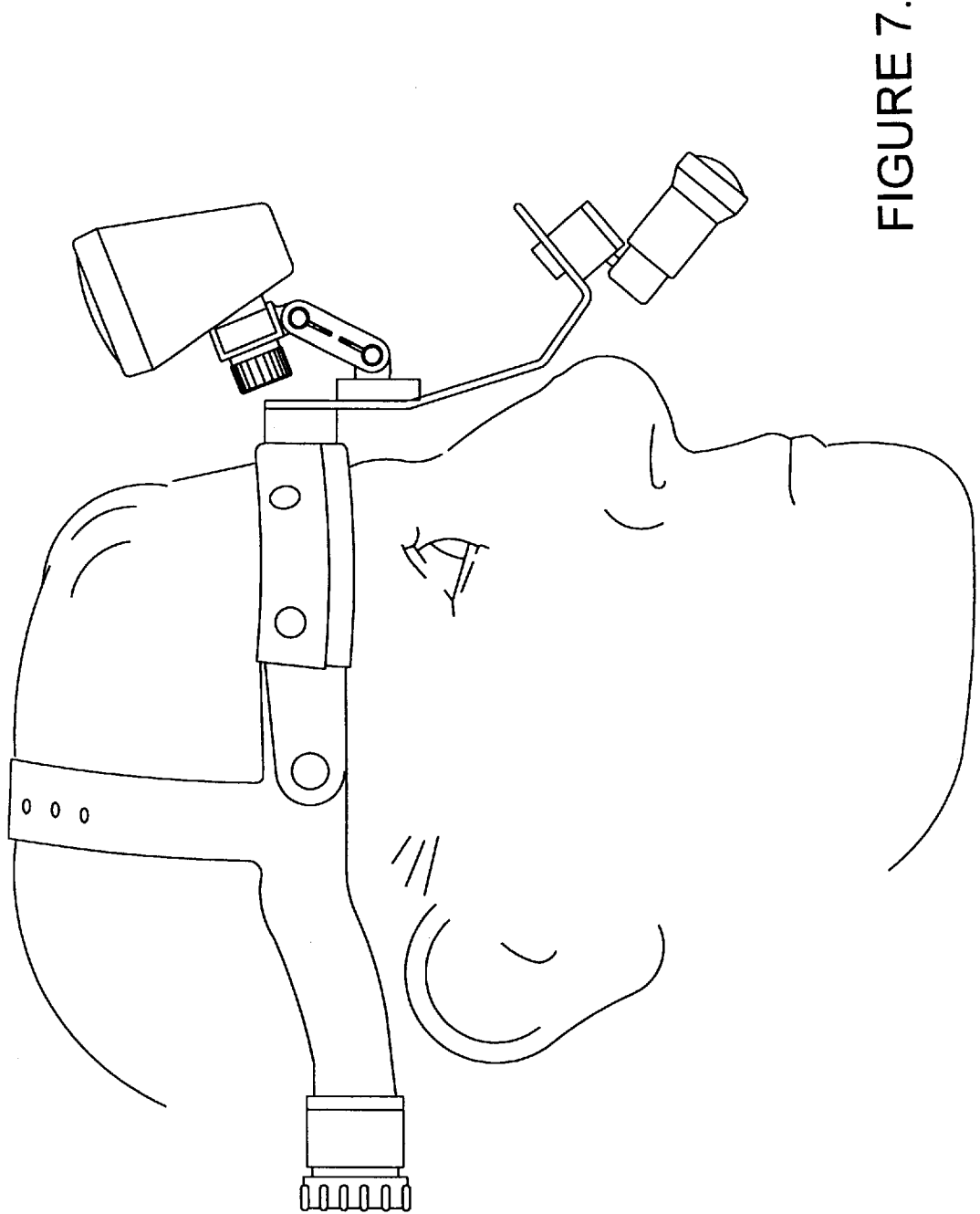
FIG. 7 illustrates, from a side perspective, a headband-mountable embodiment of the invention wherein a source of illumination is combined with a flip-up ocular mounting arrangement.

FIGS. 6 through 11 illustrate various alternative embodiments of the invention adapted for use with a headband as opposed to eyeglass frames. In particular, FIG. 6 illustrates, from an oblique perspective a headband-mountable version of the invention upon which there is mounted a source of illumination. FIG. 7 shows, from a side perspective, a headband-mountable embodiment of the invention wherein the source of illumination is combined with a flip-up ocular mounting arrangement.

Figure 8:
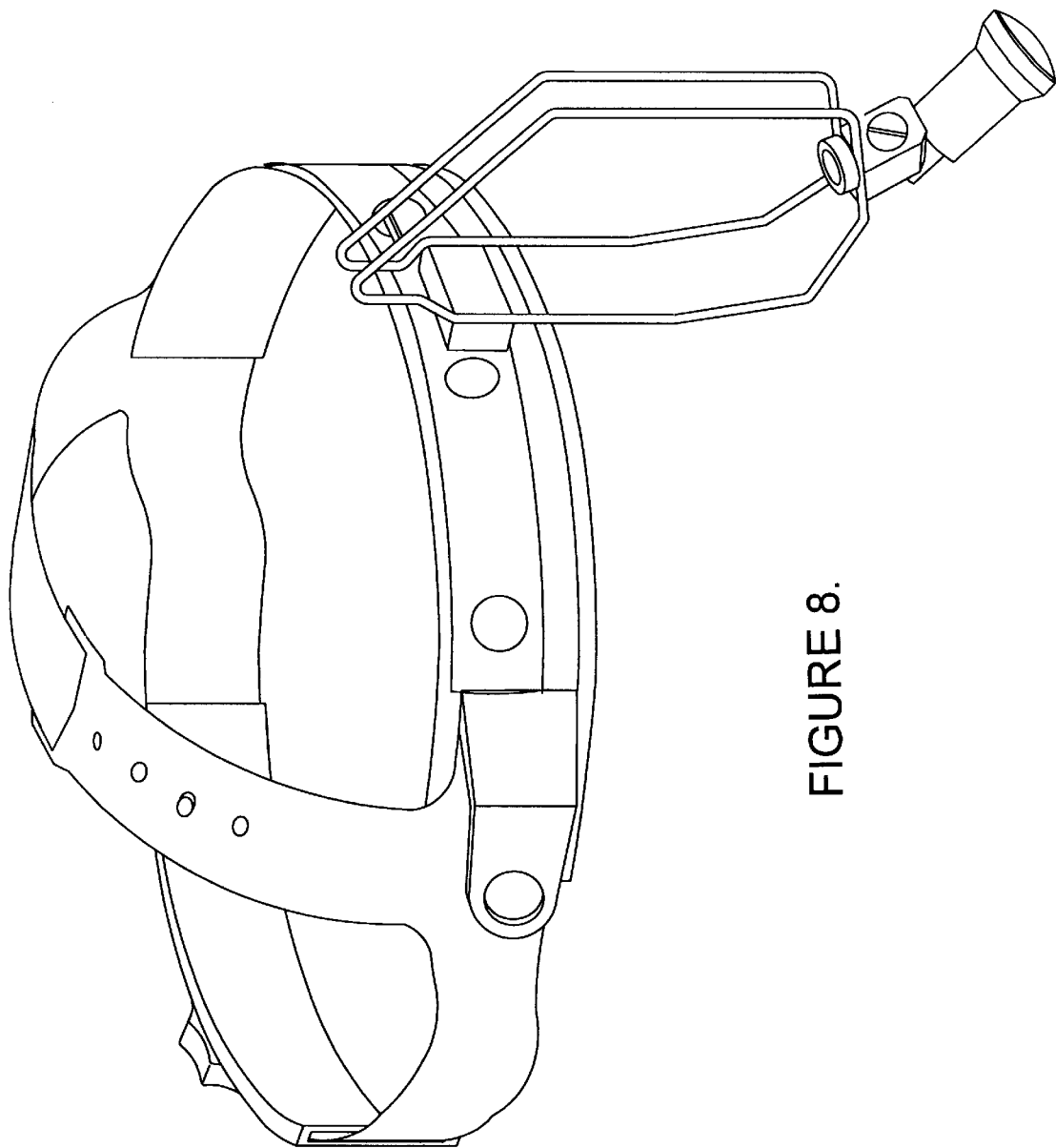
FIG. 8 illustrates from an oblique perspective yet a further alternative embodiment of the invention wherein a closed loop wire mount is used to configure a source of illumination to a headband.
Figure 9:
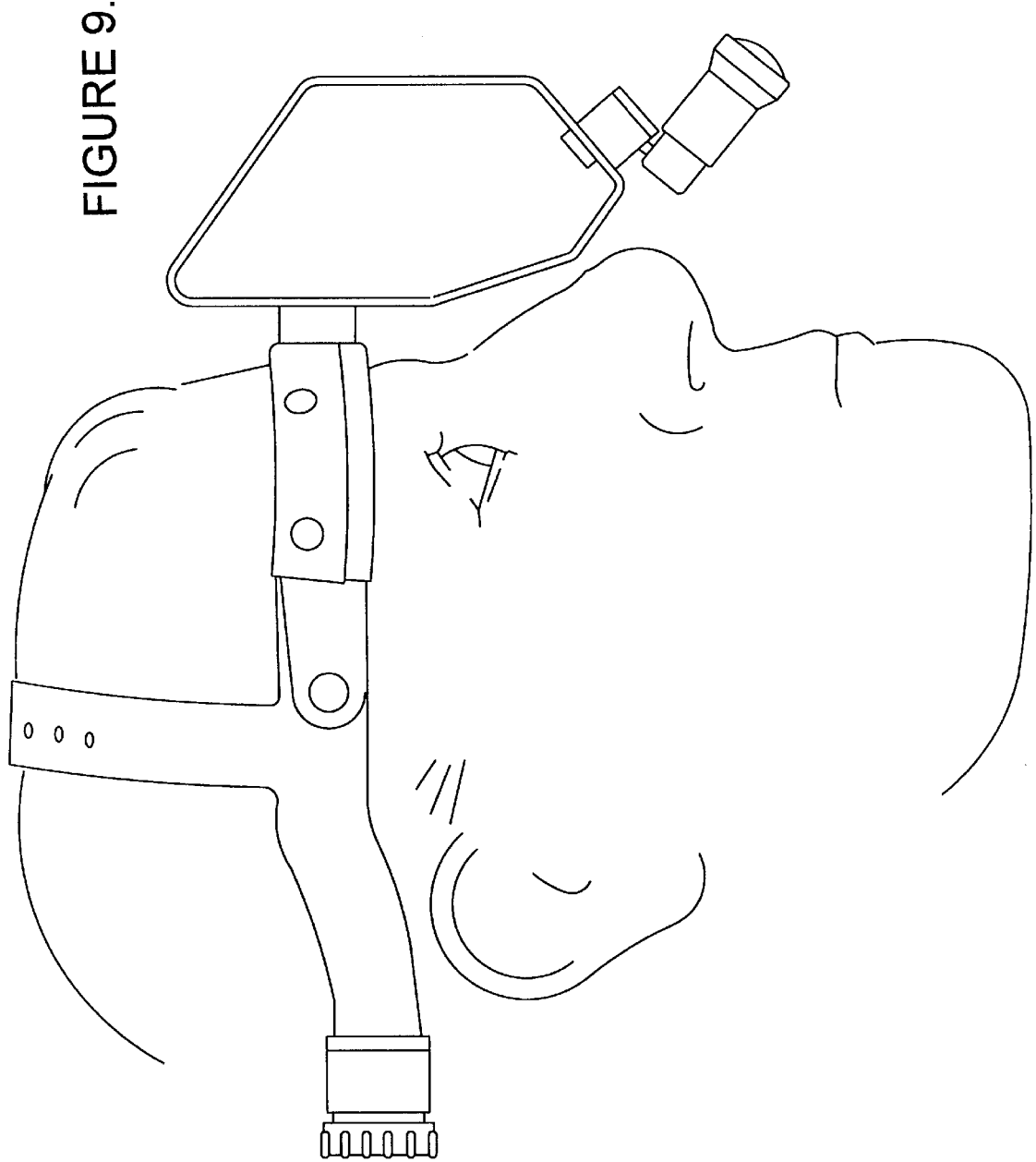
FIG. 9 illustrates the embodiment of FIG. 8 from a side view without optional nosepads.

FIG. 8 illustrates from an oblique perspective yet a further alternative embodiment of the invention wherein a closed-loop wire mount is used to configure a source of illumination to a headband. FIG. 9 shows depicts the embodiment of FIG. 8 as seen from a side-view perspective and without the optional nosepads.

Figure 10:
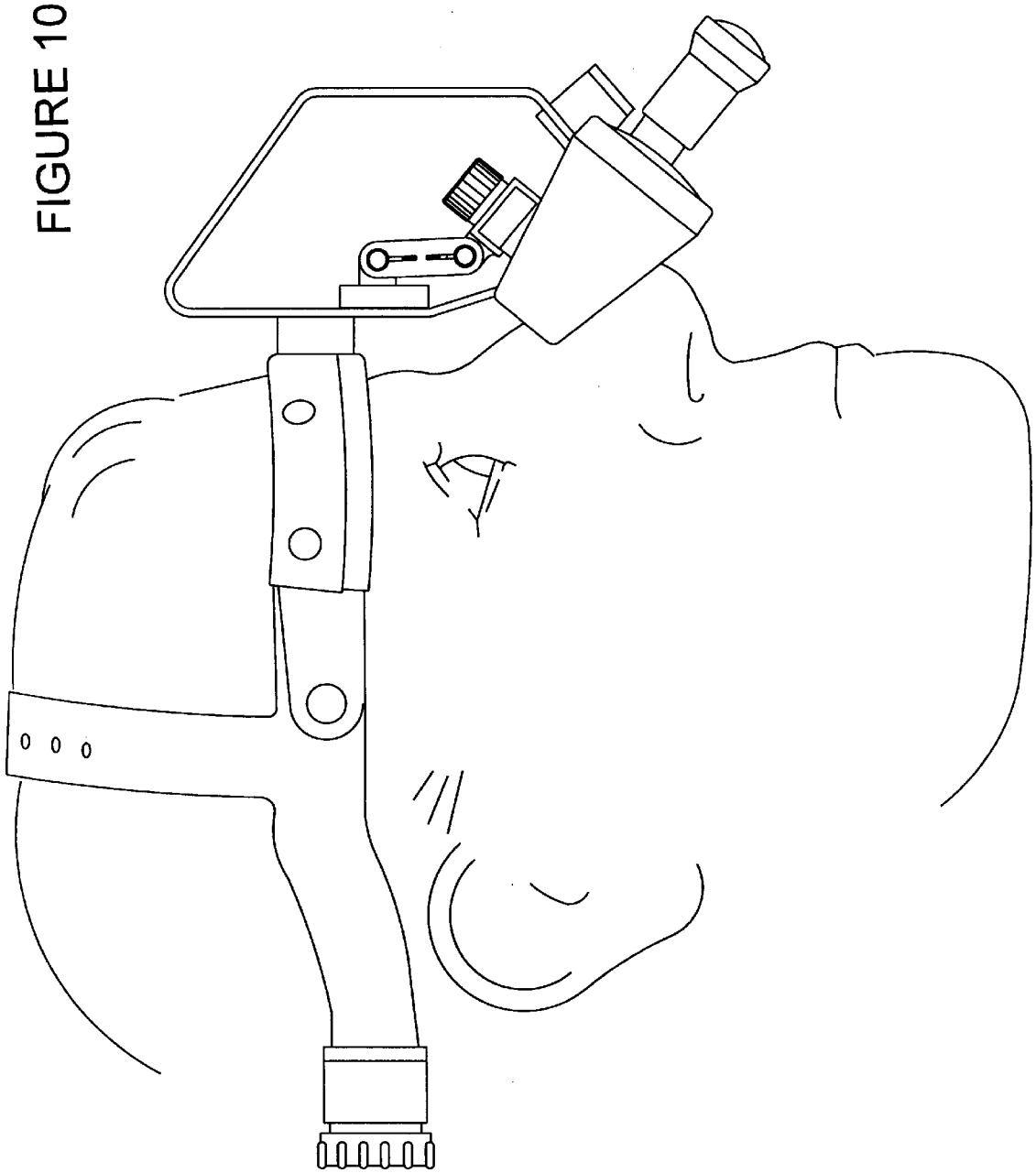
FIG. 10 shows the closed-loop version of the invention from a side perspective integrating a source of illumination with a pair of flip-up optical loupes.
Figure 11:
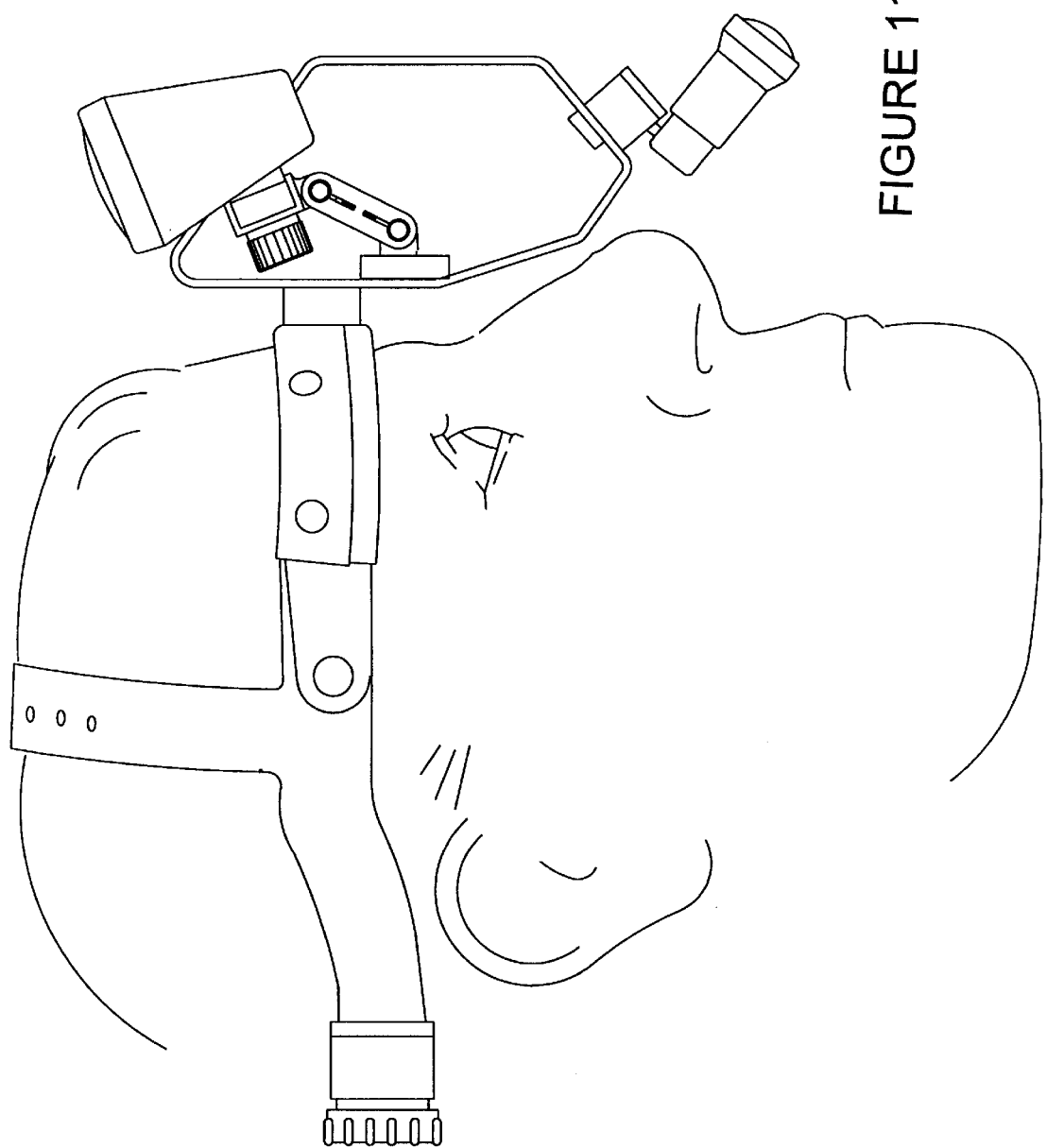
FIG. 11 illustrates the embodiment of FIG. 10 with the loupes in a flipped-up position.

FIGS. 10 and 11 depict a closed-loop embodiment of the invention in a side-view perspective, with a source of illumination being mounted along with a pair of flip-up optical loupes. FIG. 11 illustrates the embodiment of FIG. 10 with the loupes in a flipped-up position.

Thus, there has been described a versatile mounting assembly for use in conjunction with eyeglass frames for medical, dental or other environments which may require accurate or demanding visual observation. In the preferred embodiment, the invention provides a wire-frame attachable to a pair of conventional eyeglass frames, which may also include a support for a pair of flip-up oculars or telescopic loupes. The wire-frame is shaped to support a nose-pad assembly for enhanced weight distribution, and may attachably receive one of a number of accessories associated with visualization, or other purposes.

That which is claimed is:

1. Vision improvement accessory mounting apparatus, comprising:
   a shaped, elongated frame having a proximal section, a mid-section, and a distal section;
   means for mounting the proximal section of the elongated frame to an item worn by a user of the apparatus,
   the proximal section of the elongated frame extending generally downwardly when mounted, then transitioning into the mid-section at a point slightly above the outer ridge of the wearer's nose, the shape of the mid-section generally tracking the ridge of the wearer's nose in spaced-apart relation with respect thereto before transitioning into the distal section, the distal section being adapted to mountably receive one of the vision-improvement accessories; and a source of illumination mounted onto the distal section of the elongated frame such that the source of illumination is directly between the eyes of the wearer and projecting outwardly therefrom.

2. The accessory mounting apparatus of claim 1, further including a nose pad mountable to the mid-section, the nose pad including a surface adapted to bear against the ridge of the wearer's nose.

3. The accessory mounting apparatus of claim 1, wherein the item worn by a user of the apparatus is a pair of eyeglass frames.

4. The accessory mounting apparatus of claim 1, wherein the item worn by a user of the apparatus is a headband.

5. The accessory mounting apparatus of claim 1, wherein the elongated frame comprises one or more shaped wire forms.

6. The accessory mounting apparatus of claim 1, wherein the distal section is bent upwardly with respect to the mid-section.

7. The accessory mounting apparatus of claim 1, further including means for supporting a pair of oculars relative to the right and left eyes of the user.

8. The accessory mounting apparatus of claim 7, wherein the means for supporting the oculars includes a flip-up assembly enabling the oculars to be flipped up and down for use with the elongated frame remaining in place.

9. The accessory mounting apparatus of claim 1, wherein the accessory is an electronic imager.

10. The accessory mounting apparatus of claim 1, wherein the accessory is a face shield.

11. Vision improvement accessory mounting apparatus, comprising:

a shaped, elongated frame having a proximal section, a mid-section, and a distal section;

means for mounting the proximal section of the elongated frame to a portion of an item worn by a user of the apparatus, including means for supporting a pair of oculars relative to the user's eyes, the proximal section of the elongated frame extending generally downwardly when mounted, then transitioning into the mid-section at a point slightly above the outer ridge of a user's nose, the mid-section generally following the ridge of the user's nose in spaced-apart relation with respect thereto before transitioning into the distal section, the distal section being adapted to mountably receive a vision improvement accessory, including a light source; and a nose pad mountable to the mid-section, the nose pad including a surface adapted to bear against the ridge of the user's nose.

12. The accessory mounting apparatus of claim 11, wherein the item worn by a user of the apparatus is a pair of eyeglass frames.

13. The accessory mounting apparatus of claim 11; wherein the item worn by a user of the apparatus is a headband.

14. The accessory mounting apparatus of claim 11, wherein the elongated frame comprises one or more shaped wire forms.

15. The accessory mounting apparatus of claim 11, wherein the distal section is bent upwardly with respect to the mid-section.

16. The accessory mounting apparatus of claim 11, wherein the means for supporting the oculars includes a flip-up assembly enabling the oculars to be flipped up and down for use with the elongated frame remaining in place.

17. The accessory mounting apparatus of claim 16, wherein:

the light source of light has a first optical axis;

the oculars have a second optical axis; and the first and second optical axes are in parallel alignment when the oculars are flipped down for use.

* * * * *